United States Patent
Shellhammer et al.

(10) Patent No.: US 8,892,050 B2
(45) Date of Patent: Nov. 18, 2014

(54) SENSING WIRELESS COMMUNICATIONS IN TELEVISION FREQUENCY BANDS

(75) Inventors: Stephen J. Shellhammer, Ramona, CA (US); Ahmed K. Sadek, San Diego, CA (US); Wenyi Zhang, Anhui (CN)

(73) Assignee: QUALCOMM Incorporated, San Diego, CA (US)

(*) Notice: Subject to any disclaimer, the term of this patent is extended or adjusted under 35 U.S.C. 154(b) by 888 days.

(21) Appl. No.: 12/858,334

(22) Filed: Aug. 17, 2010

(65) Prior Publication Data
US 2011/0045781 A1    Feb. 24, 2011

Related U.S. Application Data

(60) Provisional application No. 61/234,774, filed on Aug. 18, 2009.

(51) Int. Cl.
*H04B 17/00*    (2006.01)

(52) U.S. Cl.
CPC .......... *H04B 17/0057* (2013.01); *H04B 17/007* (2013.01); *H04B 17/0077* (2013.01)
USPC .......................... 455/67.11; 455/62; 375/224

(58) Field of Classification Search
USPC ...................... 455/67.11, 423, 313, 3.06, 434; 370/230, 332, 252, 235, 254, 281, 312, 370/210, 203; 348/729, 731, 735, 441, 732, 348/181, 485
See application file for complete search history.

(56) References Cited

U.S. PATENT DOCUMENTS

| | | | |
|---|---|---|---|
| 5,721,783 A * | 2/1998 | Anderson | 381/328 |
| 6,175,551 B1 * | 1/2001 | Awater et al. | 370/210 |
| 2004/0264691 A1 * | 12/2004 | Kalker | 380/1 |
| 2007/0142082 A1 | 6/2007 | DaCosta | |
| 2007/0188665 A1 | 8/2007 | Watson et al. | |
| 2008/0117959 A1 * | 5/2008 | Subrahmanya et al. | 375/224 |
| 2009/0131047 A1 * | 5/2009 | Amerga et al. | 455/434 |

FOREIGN PATENT DOCUMENTS

WO    WO2008044142 A2    4/2008

OTHER PUBLICATIONS

Communications Principles by Dr. Darren Ward, Date of Publication: Nov. 2004.*
Cabric, D. et al., "Implementation Issues in Spectrum Sensing for Cognitive Radios", Conference Record of the Thirty-Eighth Asilomar Conference on Signals, Systems and Computers, Nov. 2004, pp. 772-776 vol. 1, XP-010781056.

(Continued)

*Primary Examiner* — Golam Sorowar
(74) *Attorney, Agent, or Firm* — Jeffrey D. Jacobs

(57) ABSTRACT

In general, techniques are described for sensing wireless communications in television frequency bands, which may be implemented by a sensing device comprising a sensing unit, a power spectral density (PSD) estimation unit, a filter unit, a candidate selection unit, an analysis unit and a decision unit. The sensing unit senses a signal in the television frequencies bands. The PSD estimation unit calculates an estimate of a PSD for the sensed signal. The filter unit filters the estimated PSD. The candidate selection unit analyzes the filtered PSD to identify a candidate frequency representative of a potentially in use frequency. The analysis unit computes a test statistic for the candidate frequency. The decision unit compares the test statistic to a threshold to identify whether the candidate frequencies is actively in use by wireless communication devices.

44 Claims, 6 Drawing Sheets

(56) References Cited

OTHER PUBLICATIONS

International Search Report and Written Opinion—PCT/US2010/045931—International Search Authority, European Patent Office, Feb. 14, 2011.
Matthias Wellens, et al., "Evaluation of Spectrum Occupancy in Indoor and Outdoor Scenario in the Context of Cognitive Radio", Cognitive Radio Oriented Wireless Networks and Communications, 2007. Crowncom 2007. 2nd International Conference on, IEEE, Piscataway, NJ, USA, Aug. 1, 2007, pp. 420-427, XP031276085, ISBN: 978-1-4244-0814-6.
Partial International Search Report—PCT/US2010/045931—International Search Authority, European Patent Office, Dec. 14, 2010.
Taiwan Search Report—TW099127604—TIPO—Jun. 18, 2013.

* cited by examiner

SENSING WIRELESS COMMUNICATIONS IN TELEVISION FREQUENCY BANDS This application claims the benefit of U.S. Provisional Application No. 61/234,774, filed Aug. 18, 2009, which is hereby incorporated by reference in its entirety.

TECHNICAL FIELD

This disclosure relates to wireless communications and, more particularly, wireless communications using frequencies reserved for distributing television content.

BACKGROUND

Television broadcast systems are systems responsible for the transmission of television (TV) video and audio content over the air to consumers of the content. These television broadcast systems were allocated dedicated slices or bands of frequencies, which may be referred to as "TV channels," in both the ultra high frequency (UHF) and very high frequency (VHF) frequency bands. With the emergence of competing wire-based forms of television content distribution, such as cable television distribution systems, terrestrial forms of television content distribution, such as satellite television content distribution systems, and network forms of television content distribution systems, including Internet protocol television (IPTV) distribution systems, over-the-air television broadcast systems have become less prevalent in the delivery of television content. Consequently, the dedicated TV channels in the UHF and VHF spectrums are no longer utilized to their fullest capacity by the television broadcast systems. Historically, wireless microphones have been licensed to operate in these unused TV channels. These wireless microphones are commonly used for news gathering and in-studio applications.

Recently, these dedicated TV channels in the UHF and VHF band have been opened up for use by other devices subject to a number of requirements for operation to protect use of these frequencies by TV broadcast systems and wireless microphone systems. These new devices are referred to as either TV Band Devices (TVBD) or TV White Space Devices, as these unused TV channels are often referred to generally as "white space." One such requirement is that these TV white space devices must first ensure the TV channel in which they will transmit is not currently in use by a television broadcast system or a wireless microphone. As a result of this requirement, these other devices are required to sense the radio frequency (RF) spectrum, dynamically identify unused spectral segments and then operate in these white spaces without causing harmful interference to television broadcast systems or wireless microphones. Considering that these demands require a certain amount of intelligence in the form of awareness of their RF environment and decision making, these TV white space devices are often referred to as "cognitive radios."

SUMMARY

In general, this disclosure describes techniques for detecting wireless microphones or other low-powered auxiliary device communications in frequencies reserved for distributing television content. These techniques avoid detecting noise or other random signals as active low-powered wireless communications, relying on filtering and, in some instances, known properties of interference generated by the broadcast of television signals by television broadcast systems, as well as, known properties of these wireless microphones. Using these various aspects alone or in combination with each other, the techniques facilitate detection of wireless microphones and other low-power auxiliary wireless communication devices, while potentially avoiding falsely detecting noise or other random signals as such valid wireless communications originating from active wireless microphones. In this respect, the techniques may enable more accurate identification of frequency bands consumed by wireless microphones. By identifying consumed frequency bands, the techniques may facilitate more accurate selection of a free frequency band over.

In one aspect, a method for detecting wireless communications in a range of frequencies reserved for use by television broadcast systems, the method comprising sensing, with a sensing device, a signal in the range of frequencies reserved for use by the television broadcast systems in broadcasting television content, calculating, with the sensing device, an estimate of a power spectral density (PSD) for the sensed signal, and filtering, with the sensing device, the estimated PSD to remove noise and generate a filtered PSD for the sensed signal. The method also comprising analyzing, with the sensing device, the filtered PSD to identifying one or more candidate frequencies within the range of frequencies, wherein the one or more candidate frequencies comprise frequencies potentially in use by one or more other wireless communication devices, computing, with the sensing device, one or more test statistics for each of the one or more candidate frequencies, wherein each of the one or more test statistics define a property of the one or more candidate frequencies, comparing, with the sensing device, the one or more test statistics to one or more thresholds to identify those of the candidate frequencies that are actively in use by the one or more wireless communication devices, and selecting, with the sensing device, one or more of the candidate frequencies over which to communicate wirelessly based on the comparison.

In another aspect, a sensing device that detects wireless communications in a range of frequencies reserved for use by television broadcast systems comprises a sensing unit that senses a signal in the range of frequencies reserved for use by the television broadcast systems in broadcasting television content, a power spectral density (PSD) estimation unit that calculates an estimate of a PSD for the sensed signal, and at least one filter unit that filters the estimated PSD to remove noise and generate a filtered PSD for the sensed signal. The sensing device also comprises a candidate selection unit that analyzes the filtered PSD to identify one or more candidate frequencies within the range of frequencies, wherein the one or more candidate frequencies comprise frequencies potentially in use by one or more wireless communication devices, one or more analysis units to compute one or more test statistics for each of the one or more candidate frequencies, wherein each of the one or more test statistics define a property of the one or more candidate frequencies, and a decision unit that compares the one or more test statistics to one or more thresholds to identify those of the candidate frequencies that are actively in use by the one or more wireless communication devices.

In another aspect, an apparatus for detecting wireless communications in a range of frequencies reserved for use by television broadcast systems, the apparatus comprising means for sensing a signal in the range of frequencies reserved for use by the television broadcast systems in broadcasting television content, means for calculating an estimate of a power spectral density (PSD) for the sensed signal, and means for filtering the estimated PSD to remove noise and generate a filtered PSD for the sensed signal. The apparatus also comprises means for analyzing the filtered PSD to identifying one or more candidate frequencies within the range of frequencies, wherein the one or more candidate frequencies comprise frequencies potentially in use by one or more wireless communication devices, means for computing one or more test statistics for each of the one or more candidate frequencies, wherein each of the one or more test statistics define a property of the one or more candidate frequencies, and means for comparing the one or more test statistics to one or more thresholds to identify those of the candidate frequencies that are actively in use by the one or more wireless communication devices.

In another aspect, a computer-readable storage medium includes instructions that cause a programmable processor to sense a signal in a range of frequencies reserved for use by television broadcast systems in broadcasting television content, calculate an estimate of a power spectral density (PSD) for the sensed signal, filter the estimated PSD to remove noise and generate a filtered PSD for the sensed signal, analyze the filtered PSD to identifying one or more candidate frequencies within the range of frequencies, wherein the one or more candidate frequencies comprise frequencies potentially in use by one or more wireless communication devices, compute one or more test statistics for each of the one or more candidate frequencies, wherein each of the one or more test statistics define a property of the one or more candidate frequencies, and compare the one or more test statistics to one or more thresholds to identify those of the candidate frequencies that are actively in use by the one or more wireless communication devices.

In another aspect, a method for obtaining features of a high-resolution power spectral density (PSD) of a detected signal, the method comprising determining a height of the center of an energy concentration having a main lobe, wherein the height is measured as a difference between $S[k_c]$ and a reference floor level, wherein the reference floor level captures any surrounding, non-energy concentration, and noise, and wherein the reference floor level is estimated as the mean, median, or minimum of $S[k]$, $k=-K+1, \ldots, -1, 0, 1, \ldots, K$, determining a width of the main lobe of the energy concentration, wherein the width is measured as a total number of frequency bins surrounding $k_c$ satisfying $S[k]>S[k_c]/W$, wherein $W>1$ is a threshold parameter, and wherein the total number of frequency bins may be converted into hertz, and in order to refine the width estimate, including interpolating, and determining a power of the main lobe of the energy concentration, wherein the power is measured as the ratio between the power of frequency bins surrounding $k_c$, and a total power expressed as $$\sum_{k=k_c-V}^{k_c+V} \frac{S[k]}{\sum_{k=-K+1}^{K} S[k]},$$

wherein V is a parameter specifying the number of frequency bins that correspond to the main lobe.

In another aspect, a method of determining whether the detected signal is a legitimate wireless microphone signal, when a co-channel signal is an NTSC signal, the method comprises detecting a peak at a frequency equal to 5.75 MHz greater than the lower band edge frequency.

The details of one or more examples are set forth in the accompanying drawings and the description below. Other features, objects, and advantages will be apparent from the description and drawings, and from the claims.

DETAILED DESCRIPTION

Figure 1:
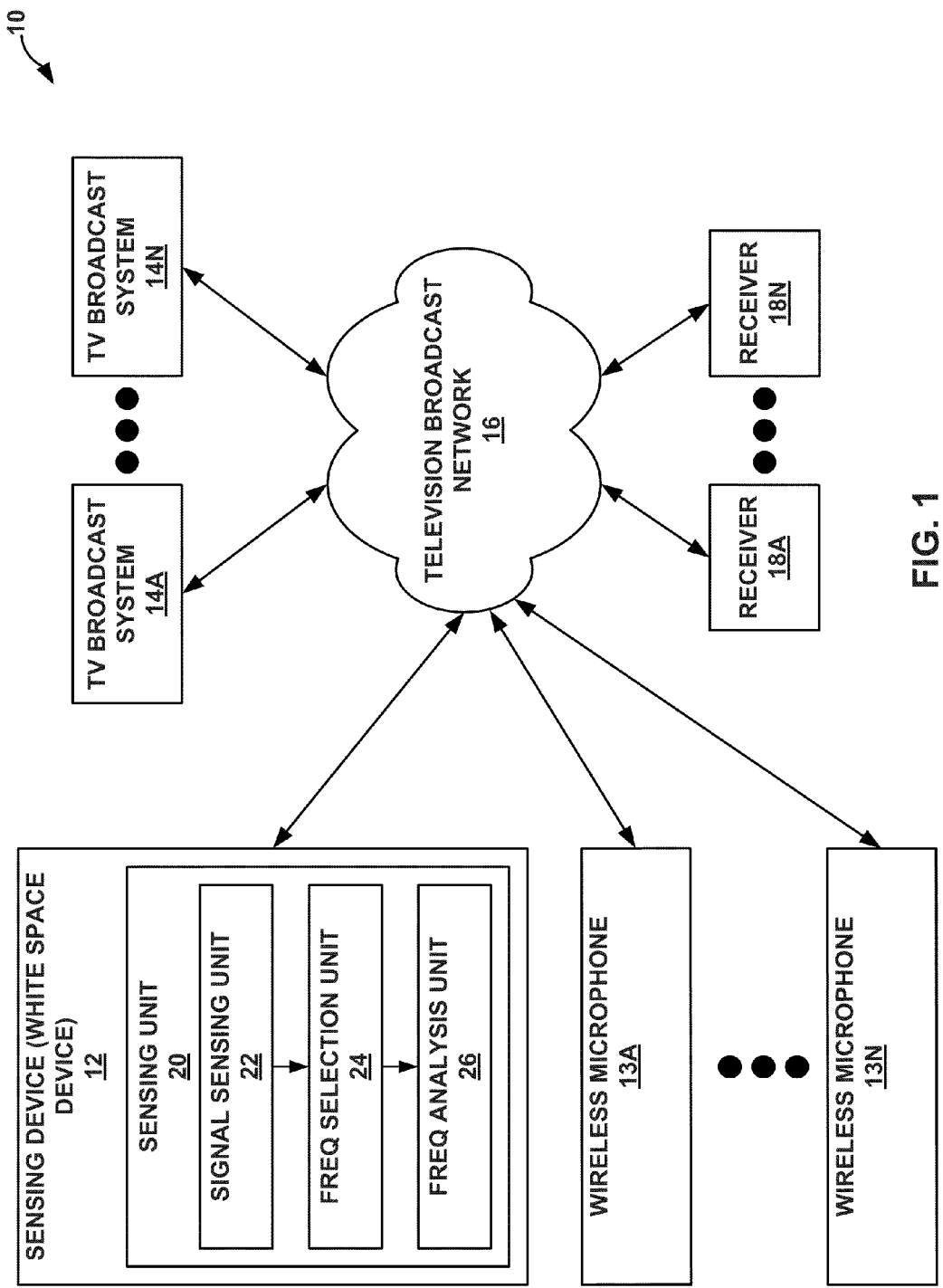
FIG. 1 is a block diagram illustrating an example system in which a wireless communication device implements the wireless communication sensing techniques described in this disclosure to select an available frequency band over which to communicate wirelessly.

FIG. 1 is a block diagram illustrating an example system 10 in which a sensing device 12 implements the wireless communication sensing techniques described in this disclosure to select an available frequency band over which to communicate wirelessly. Also shown in the example of FIG. 1, system 10 includes wireless microphones 13A-13N ("wireless microphones 13"), television (TV) broadcast systems 14A-14N ("TV broadcast systems 14"), a television (TV) broadcast network 16 and receivers 18A-18N ("receivers 18"). While shown in the example of FIG. 1 as various devices residing in distinct groups for purposes of illustration, wireless microphones 13, TV broadcast systems 14, and receivers 18 are typically located in different geographical locations and interspersed among each other within an area covered by television broadcast network 16.

Sensing device 12 represents any device capable of sensing signals and implementing the techniques described in this disclosure. Sensing device 12 may be embedded or its functionality may be implemented in a general class of devices referred to as wireless communication devices. Wireless communication devices in this exemplary context refer to wireless microphones, including wireless microphones 13, so called "cognitive radios" or "white space devices," including particular white space devices that operate in the TV band of frequencies and that are referred to as TV white space devices.

Wireless microphones 13 each represent a device capable of wireless communication using one or more frequencies reserved for use in broadcasting television content. Often this wireless communication is low-power and, for this reason, wireless microphones 13 may be referred to as "low-power auxiliary wireless microphones 13." Such low-power communication is generally characterized by a limited range of wireless communication that extends hundreds of feet rather than the multiple mile range of high-power wireless communication used to transmit television content.

The terms "cognitive radios" and "white space devices" generally refer to the same class or type of device where TV white space devices is a sub-class of the "white space device" class. The techniques of this disclosure generally apply or are implemented by cognitive radios or white space devices to detect or otherwise identify low-power wireless communications output by other wireless communication devices, and specifically in this example, wireless microphones using the range of frequencies previously reserved for use by television broadcast systems 14. Although described with respect to this and other exemplary assumptions, the techniques should not be limited to this or any other context but may generally be implemented by any wireless communication device capable of sensing any wireless communication, including television broadcast system communications and wireless communication device communications, in the range of frequencies previously reserved for use by television broadcast systems 14.

Television broadcast systems 14 each represent one or more devices responsible for wireless broadcasting of television content via television broadcast network 16 to one or more of receivers 18. Television broadcast systems 14 may be adapted to broadcast television content in accordance with a National Television System Committee (NTSC) standard or format or any other analog standard or format and/or in accordance with an Advanced Television Standards Committee (ATSC) standard or format or any other digital standard or format. Other standards or formats include a Digital Video Broadcasting (DVB) format, a Terrestrial Digital Multimedia Broadcasting (T-DMB) format, an Integrated Services Digital Broadcasting Terrestrial (ISDB-T) format, and a Moving Picture Experts Group Transport Stream (MPEG-TS) format provided by International Standard ISO/IEC 13818-1

ATSC standards are a set of standards developed by the Advanced Television Systems Committee for digital television transmission. DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). DMB is a digital radio transmission technology for sending multimedia data to mobile devices. ISDB is a Japanese standard for digital television and digital radio. Other wireless standards that may benefit from the teaching of this disclosure include mobile broadcast standards such as Advanced Television Systems Committee—Mobile/Handheld (ATSC M/H), FO EV, Digital Multimedia Broadcast-handheld (DVB-H), Digital Multimedia Broadcast-satellite services to handheld DVB-SH, and next generation mobile broadcast standards. In addition, NTSC standards and next generation National Television System Committee NTSC standards may benefit from the teaching of this disclosure. Also, standards such as third generation (3G) standards, third-generation multimedia broadcast multicast service (3G MBMS), Broadcast and Multicast Services (BCMCS), long term evolution broadcast (LTE (broadcast)), or numerous other standards may benefit as well. With these and other standards, the blanking techniques of this disclosure may be used during sensing as well as for other reasons.

Television broadcast network 16 generally represents frequencies reserved for the broadcasting of television content by television broadcast systems 14. These frequencies include those within a very high frequency (VHF) band, i.e., currently 54-216 mega-hertz (MHz), and an ultra-high frequency (UHF) band, i.e., currently 70-1002 MHz. Bands of frequencies within each of these VHF and UHF bands are often referred to as "television channels." Each of television broadcast systems 14 generally purchases or is otherwise assigned a different television channel over which to broadcast television content within the geographical area represented serviced by television broadcast network 16.

Receivers 18 generally represent any device capable of receiving either high-power wireless communication signals or low-power wireless communication signals, which as defined above are generally differentiated by the amount of power used to broadcast each signal, where such power is generally measured as a range of propagation of the signal for practical purposes. That is, a wireless microphone wirelessly broadcasts a signal within a given wireless microphone channel (which is generally a sub-channel within a television channel) generally on the order of hundreds of feet while each of television broadcast systems 14 may broadcast a signal on the order of tens of miles. Receivers 18 may comprise analog televisions (TVs), digital televisions, set-top boxes (STBs), digital television conversion boxes, a so-called audio-visual (A/V) receiver, an audio receiver, a wireless microphone receiver, an integrated speaker having a receiver, or any other device capable of receiving signals in either or both of the VHF band or the UHF band.

In the past, both the VHF and UHF band of frequencies were reserved for use strictly by television broadcast systems 14 without regard to whether or not all of the channels within these bands were actually in use. As time has progressed and various competing forms of distributing television content emerged, e.g., cable and satellite television distribution systems, consumers shifted from receiving television content primarily via over-the-air wireless broadcasting to receiving television content via one of these competing distribution systems with the result that many local, rather than national, television stations either went out of business or migrated their content to national television stations, cable broadcast systems, satellite broadcast systems or some other form of distribution, such as the Internet. Considering that these local television stations left the wireless broadcast form of distribution for at those reasons identified above, the number of channels used within the VHF and UHF bands has drastically decreased from its peak usage before the emergence of competing forms of television content distribution.

Concurrent to the reduction of use of the VHF and UHF bands by television broadcast systems 14 is the increasing use of other bands of the available spectrum for wireless cellular communications and wireless Internet or data communications. Currently, portable devices, such as cellular phones (including so-called "smart phones"), so-called "netbooks," personal digital assistants (PDAs), laptops, and slate or tablet computers, have grown in popularity to the point that frequency bands reserved for use by these various devices have become crowded, particularly in densely populated areas, such as large metropolises. There have been a number of proposals to broaden and expand these frequency bands by shifting frequency bands reserved for use by other devices to other less utilized bands.

One innovative proposal, which was recently granted, relies not on statically assigned frequency bands that are reserved strictly for use by particular classes of devices or for the distribution of particular types of content but on technological advances to, in effect, more intelligently utilize frequency bands. In this proposal, a particular class of device, which may be referred to as cognitive radios, white space devices or television (TV) white space devices, would be allowed to utilize the under-utilized VHF and UHF bands for low-power wireless communication so long as they adhere to certain requirements. One such requirement is that these low-power wireless communication devices, prior to communicating via a desired wireless communication channel, monitor the desired wireless communication channel to sense use of this channel by television broadcast systems 14 or other wireless communication devices so as to avoid interfering with the signals output by television broadcast systems 14 or the other wireless communication devices.

However, sensing the low-power wireless communication signals output by other wireless communication devices is difficult considering the low-power of these signals and the presence of noise in the channel. At very low power levels there exists noise due to out of band emission from TV broadcast signals, which is often narrowband and similar in characteristics to a wireless microphone signal. Often, attempting to sense these signals results in false positive detection of noise as valid low-power wireless communication signals when no such other wireless communication device is actively transmitting or otherwise communicating these signals. Without more accurate identification of these low-power wireless communication signals, wireless communication devices may observe noise and other random signals as valid low-power wireless communications, leaving the wireless communication devices with increasingly less channels they can utilize for wireless communications. In noisy environments with multiple wireless communication devices all attempting wireless communications concurrently, such as large conventions, the wireless communication devices may be unable to detect an available wireless communication channel (especially when these environments include a number of devices that communication in adjacent frequencies or other produce noise in the VHF and UHF bands that lead to false positives).

In accordance with the low-power wireless communication sensing techniques described in this disclosure, certain wireless communication devices 12, such as sensing device 12 which represents a white space device 12 in the example of FIG. 1, may more accurately detect wireless communication devices in frequencies reserved for distributing television content. These techniques avoid detecting noise or other random signals as active wireless communications, relying on filtering and, in some instances, known properties of interference generated by the broadcast of television signals by television broadcast systems, as well as, known properties of these wireless microphones. Using these various aspects alone or in combination with each other, the techniques facilitate detection of wireless communication devices and specifically low-power wireless communication devices, such as wireless microphones, while potentially avoiding falsely detecting noise or other random signals as such valid wireless communications originating from active wireless communication devices. In this respect, the techniques may enable more accurate identification of frequency bands consumed by both television broadcast systems and other wireless communication devices. By identifying consumed frequency bands, the techniques may facilitate more accurate selection of a free frequency band over which a device that implements these sensing techniques may wirelessly communicate.

As shown in the example of FIG. 1, white space device 12 includes a sensing unit 20, which may represent hardware or a combination of hardware and software responsible for wirelessly transmitting content via one or more wireless communication channels. Sensing unit 20 includes a signal sensing unit 22 to perform various sensing aspects of the techniques described in this disclosure, a frequency selection unit 24 ("freq selection unit 24") to perform various selection aspects of the techniques described in this disclosure and a frequency analysis unit 26 that performs various analysis aspects of the techniques described in this disclosure. While the techniques of this disclosure are described with respect to a particular device, i.e., white space device 12, the techniques may be implemented by one or more of passive or active wireless communication devices that include units or modules for sensing low-powered wireless communications. In this and other respects, the techniques should not be limited to the example of FIG. 1.

Signal sensing unit 22 represents a unit that senses signals broadcast via television broadcast network 16, including wireless communication signals output by wireless microphones 13 in the range of frequencies previously reserved for use by television broadcast systems 14. Although not shown in the example of FIG. 1 for ease of illustration purposes, sensing unit 20 includes various components necessary for sensing a signal, including an antenna and other components generally required to sense a signal with some amount of accuracy. Signal sensing unit 22 senses one or more desired wireless communication channels within the range of frequencies represented as television broadcast network 16 using these various sensing components. In this manner, signal sensing unit 22 senses a signal in a range of frequencies reserved for use by television broadcast systems in broadcasting television content.

Frequency selection unit 24 represents a unit that selects candidate wireless communication channels from those one or more desired wireless communication channels, where the candidate wireless communication channels represent those of the desired wireless communication channels that are most likely not currently in use by either television broadcast systems 14 or other wireless communication devices, e.g., wireless microphones 13. Considering that frequency selection unit 24 selects candidate frequencies, frequency selection unit 24 may be referred to as a candidate frequency selection unit 24.

Frequency selection unit 24 may select candidate frequencies from among the desired wireless communication channels by first calculating an estimate of a power spectral density (PSD) for one of the sensed signals. The PSD describes how the power of a signal is distributed with respect to frequency. Mathematically, the PSD is defined as the Fourier transform of the autocorrelation sequence of the time series, which is the data representative of the sensed signal, or as the squared modulus of the Fourier transform of the time series scaled by a proper constant term. The estimate of the PSD may be calculated in accordance with conventional or known formulas, an example of which is provided below.

After estimating the PSD, frequency selection unit 24 filters the estimated PSD to remove noise and generate a filtered PSD for the sensed signal. To filter the estimated PSD, frequency selection unit 24 may first convert the estimated PSD into a decibel format or representation of the estimated PSD. Frequency selection unit 24 may then apply a median filter to this estimated PSD in decibel format to generate a median filtered decimal representation of the estimated PSD. To this median filtered estimated PSD, frequency selection unit 24 may next apply a linear low-pass filter to generate a filtered estimate PSD. Frequency selection unit 24 then analyzes the filtered estimated PSD to identify one or more candidate frequencies, where the one or more candidate frequencies comprise frequencies potentially in use by one or more other wireless communication devices in the range of frequencies represented as the filtered estimated PSD. Frequency selection unit 24 passes these candidate frequencies to frequency analysis unit 26 along with the filtered estimated PSD.

Frequency analysis unit 26 represents a unit that analyzes the candidate frequencies in the filtered estimated PSD to identify one of the candidate frequencies that is available for use by sensing unit 20 for wireless communicating with one or more of receivers 18. Frequency analysis unit 26 generally analyzes the filtered estimated PSD by first computing one or more test statistics for each of the one or more identified candidate frequencies. The term "test statistic" refers to a metric that describes one or more properties of a candidate frequency.

An example test statistic may describe a maximum value in relation to a reference value of a local segment of the filtered estimated PSD centered at one of the identified candidate frequencies. Another example test statistic may describe a bandwidth centered at the candidate frequency within the filtered estimated PSD. Yet another example test statistic may describe an area under a curve of the filtered estimated PSD centered at the candidate frequency. Similar to the third example test statistic that describes the area under the PSD centered around the candidate frequency, a fourth example test statistic may describe the area under the PSD centered around the test frequency, but prior to computing this area for the fourth test statistic, frequency analysis unit 26 first converts the filtered estimated PSD back to the linear domain. A fifth example test statistic may define a generalized mean of the filtered estimated PSD in the linear domain. A sixth test statistic may introduce the time dimension by sensing signals and computing filtered estimated PSDs at set or random intervals of time, where one or more of the above five exemplary test statistics may be computed for each of these filtered estimated PSDs to generate test statistic sequences that vary over time. From this example sixth test statistic sequence, a number of other test statistics may be computed, such as an average of the test statistic sequence, a variance of the test statistic sequence, a peak-to-peak variation of the test statistic sequence, a generalized average of the test statistic sequence for different exponent values, and an autocorrelation or correlation coefficient at different shifts to identify dependencies between statistics in the test statistic sequence. In this manner, frequency analysis unit 26 computes one or more test statistics for each of the one or more candidate frequencies, where each of the one or more test statistics defines a property of the one or more candidate frequencies.

Frequency analysis unit 26 also stores data defining thresholds to which frequency analysis unit 26 compares the one or more test statistics to a threshold or thresholds to identify those of the candidate frequencies that are actively in use by the one or more other wireless communication devices. These thresholds may be pre-defined for each of the test statistics. Alternatively, these thresholds may be configured by a user or administrator of white space device 12. In some instances, these thresholds are dynamically adjusted and tailored over time using learning algorithms or other artificial intelligence algorithms such that these thresholds are adaptable to any given environment. Frequency analysis unit 26 then selects one or more of the candidate frequencies over which to communicate wirelessly based on the comparison.

By implementing the techniques of this disclosure, white space device 12 avoids detecting noise (often manmade noise that is different from so-called "thermal noise") or other random signals as active wireless communications, relying on filtering and, in some instances, known properties of television broadcast systems and television signal propagation, as well as, known properties of wireless communication devices, as will be described in more detail below. Using these various aspects alone or in combination with each other, the techniques facilitate detection of wireless communication devices by white space device 12, while potentially avoiding falsely detecting noise or other random signals as valid wireless communications originating from active wireless communication devices. In this respect, by implementing the techniques described in this disclosure, white space device 12 may more accurately identify frequency bands consumed by both television broadcast systems and other wireless communication devices, like wireless microphones. By identifying consumed frequency bands, white space device 12 may more accurately select a free frequency band over which to wirelessly communicate with one or more of receivers 18.

Figure 2:
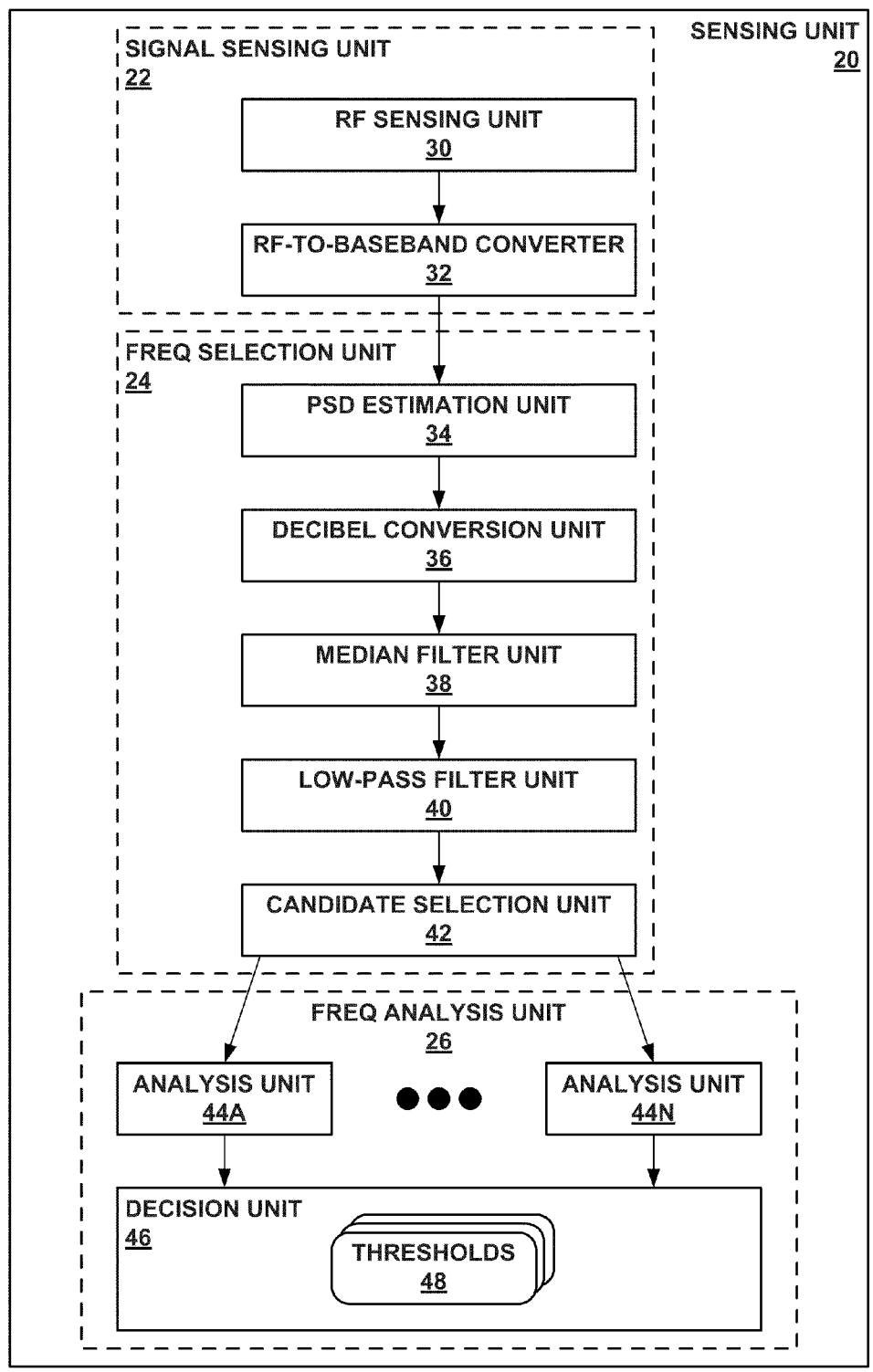
FIG. 2 is a block diagram illustrating various aspects of the sensing unit of FIG. 1 in more detail.

FIG. 2 is a block diagram illustrating various aspects of sensing unit 20 of FIG. 1 in more detail. As described above with respect to the example of FIG. 1, sensing unit 20 includes signal sensing unit 22, frequency selection unit 24 and frequency analysis unit 26. While shown as included within sensing unit 20, signal sensing unit 22, frequency selection unit 24 and frequency analysis unit 26 may reside external to sensing unit 20 in for example, a channel selection unit that provides suitable interfaces for programming or otherwise configuring sensing unit 20 to utilize a wireless communication channel selected by channel selection unit for wirelessly communicating with one or more of receivers 18. The techniques should therefore not be limited in this respect to the examples shown in both of FIGS. 1 and 2. Sensing unit 20 may be embedded in a transmitter unit, receiver unit, or transceiver unit (a combined transmitter/receiver unit) that is responsible for transmitting, receiving or both transmitting and receiving signals.

As shown in the example of FIG. 2, signal sensing unit 22 includes a radio frequency (RF) sensing unit 30 ("RF sensing unit 30") and an RF-to-baseband converter 32. RF sensing unit 30 represents a unit that senses RF signals in what may be referred to as the television spectrum, where the television spectrum comprises any portion of the electromagnetic spectrum reserved for use by television broadcast systems 14, such as the VHF and UHF bands. RF sensing unit 30 may sense other portions of the usable electromagnetic spectrum and should not be limited in this respect to the television spectrum. RF sensing unit 30 may represent the necessary antennas, amplifiers, and other hardware components necessary to sense RF signals in this television spectrum.

RF-to-baseband converter 32 represents a unit that converts the RF signal sensed by RF sensing unit 30 to a corresponding baseband signal. In effect, RF-to-baseband converter 32 demodulates the sensed RF signal to produce the corresponding baseband signal, where a baseband signal generally refers to a signal that can include frequencies that are very near zero. RF signals are generally modulated such that lower frequencies near zero are modulated to higher frequencies. RF-to-baseband converter 32 demodulates this RF signal to form the corresponding baseband signal, which it outputs to frequency selection unit 24.

Also as shown in the example of FIG. 2, frequency selection unit 24 includes a PSD estimation unit 34, a decibel conversion unit 36, a median filter unit 38, a low-pass filter unit 40 and a candidate selection unit 42. PSD estimation unit 34 represents a unit that determines an estimate power spectral density (PSD) for the received baseband signal. PSD estimation unit 34 may estimate the PSD according to any known conventional algorithms. One such algorithm estimates the PSD using a Periodogram for the baseband signal, which involves the use of a fast Fourier transform (FFT) to calculate the discrete Fourier transform. Another such algorithm estimates the PSD by calculating the autocorrelation function of the baseband signal and then estimating the PSD from the autocorrelation function.

In some instances, for example, PSD estimation unit 34 may compute the PSD of the entire signal bandwidth via spectral estimation algorithms such as an averaging periodogram. PSD estimation unit 34 may utilize multiple averages in order to effectively suppress the random disturbance due to noise. PSD estimation unit 34 then applies the spectral scanning algorithms to the estimated PSD, resulting in a collection of frequencies at which noticeably stronger energy concentration exists. This collection of frequencies may be denoted as $\{f_1, f_2, \ldots, f_K\}$, where K is a random number. When K is equal to zero, no candidate frequency is detected and decision unit 46 may decide that no wireless communications are present.

In any event, PSD estimation unit 34 may determine a high-resolution PSD estimate corresponding to a candidate frequency $f_k$ by, in one example, performing frequency translation. Frequency translation involves multiplying the signal sequence x[i], i=1, ..., n by a complex carrier exp[−j2π$f_k$iT], where j=$\sqrt{-1}$, and T is the time interval length of sampling. PSD estimation unit 34 may additional perform a form of low-pass filtering on the frequency-translated signal sequence. The bandwidth of the low-pass filter applied to this sequence is chosen to be sufficiently narrow in order to eliminate noise and adjacent-band (or TV channel) interference and sufficiently wide in order not to distort in-band signal components. PSD estimation unit 34 may then perform decimation or, as it is also known, down sampling, resulting in a signal sequence that is narrowband (e.g., 100 KHz) and Nyquist-sampled. PSD estimation unit 34 next performs a fast Fourier transform (FFT) on the decimated signal sequence. From the result of performing the FFT, PSD estimation unit 34 computes the squared magnitudes of the FFT as the PSD estimate for the original sequence. With multiple signal sequences available, their PSD estimates can be averaged in order to suppress noise.

Regardless of the algorithm chosen to estimate the PSD, PSD estimation unit 34 outputs an array of estimate PSD values S(k), which are defined in accordance with the following equation (1):

$$S(k) \text{ for } \left(\frac{-N}{2}\right) \leq k \leq \left(\frac{N}{2} - 1\right). \tag{1}$$

PSD estimation unit 34 outputs these estimate PSD values to decibel conversion unit 36. Decibel conversion unit 36 represents a unit that converts any input into decibel (dB) format accordingly to commonly known algorithms. Decibel conversion unit 36 outputs decibel formatted estimate PSD values T(k), which are expressed mathematically by the following equation (2):

$$T(k)=10 \log_{10}[S(k)] \tag{2}$$

Decibel conversion unit 36 outputs these decibel formatted estimate PSD values T(k) to median filter unit 38. Median filter unit 38 applies a median filter to the decibel formatted estimate PSD values T(k), wherein the median filter is a non-linear filter whose output is the median of the last M input values. Application of the median filter to the decibel formatted estimate PSD values T(k) can be expressed mathematically by the following equation (3):

$$U(k)=\text{median}[T(k),T(k-1), \ldots T(k-M+1)], \tag{3}$$

where U(k) represents the median filtered PSD values. Median filter unit 38 outputs these median filtered PSD values U(k) to low-pass filter unit 40.

Low-pass filter unit 40 receives these values U(k) and applies a linear low-pass filter to remove any high-frequency components introduced by the application of the median filter to values T(k). This low-pass filter may be represented mathematically by its impulse response h(k). Low-pass filter unit 40 outputs the result of applying this low pass filter as low-pass filtered PSD values V(k), where these values may be derived mathematically according to the following equation (4):

$$V(k)=U(k)*h(k) \tag{4}$$

Low-pass filter unit 40 outputs these values V(k) to candidate selection unit 42.

Candidate selection unit 42 represents a unit that identifies one or more candidate frequencies through application of one or more selection algorithms. In accordance with a first selection algorithm, candidate selection unit 42 selects an index $k_0$ of the maximum value of low-pass filtered PSD values V(k). Once the index of the maximum value is selected (which again is represented by $k_0$), candidate selection unit 42 removes a segment around that index and then finds the index of the maximum value of the remaining portion of V(k). The portion around the selected index $k_0$ is removed or eliminated so that candidate selection unit 42 is not able to select a value very close to $k_0$, which corresponds to approximately the same frequency and could be originated by the same wireless communication device that originated the signal at the frequency corresponding to selected index $k_0$.

Alternatively, or in conjunction with the first selection algorithm, candidate selection unit 42 may implement a second selection algorithm. This second selection algorithm involves finding the index $k_0$ such that the value of V(k) at $k_0$ is much larger than the minimum value of V(k) in a neighborhood of indices centered around $k_0$. Similar to the first selection algorithm, once the index of the maximum value is selected, candidate selection unit 42 removes a segment around the selected index and then finds the index of the maximum value of the remaining portion of V(k) when implementing the second selection algorithm for the same reasons as that stated above with respect to the first selection algorithm, i.e., to avoid detecting signals originated by the same wireless communication device that originated the signal at the frequency corresponding to selected index $k_0$. Regardless of the selection algorithm employed, candidate selection unit 42 forwards the selected candidate frequencies to frequency analysis unit 26.

In some instances, PSD estimation unit 34 may calibrate the estimate of the PSD for a given candidate frequency. Although not shown in the example of FIG. 2, candidate frequency selection unit 42 may provide a candidate frequency $f_k$ to PSD estimation unit 34 to refine the PSD. PSD estimation unit 34 may perform this calibration because the candidate frequency $f_k$ is obtained through scanning the discrete PSD of the entire TV channel and thus has a low resolution limited by the size of the FFT used. Such a low resolution often leads to certain frequency offset between the candidate frequency $f_k$ and the actual frequency of the center of the energy concentration. When $f_k$ is used to translate the signal, the center of the energy concentration will generally not be perfectly aligned at the center of the high-resolution narrowband PSD estimate. Consequently, the center of the energy concentration may not simply be taken as the center of the high-resolution PSD, but may be estimated as the frequency location of the maximum within a window around the center of the high-resolution PSD. This window may be sized twice the maximum possible frequency bin size of the PSD estimate described above. The maximum possible frequency offset can be taken as the frequency bin size of the PSD estimate of the entire TV channel. In this manner, a high-resolution PSD estimate may be provided for candidate frequencies. This high-resolution PSD estimate may then be provided by either PSD estimation unit 34 or candidate selection unit 42 to analysis units 44 of frequency analysis unit 26.

As further shown in the example of FIG. 2, frequency analysis unit 26 includes a number of analysis units 44A-44N ("analysis units 44") and a decision unit 46. While shown as include a number of analysis units 44, frequency analysis unit 26 may include one or any other number of analysis units 44 and the techniques should not be limited in this respect to the example of FIG. 2. Each of analysis units 44 implement one or more analysis algorithms that analyze the received candidate frequencies, producing what are referred to as "test statistics," which decision unit 46 may utilize in determining whether the corresponding one of the candidate frequencies represents an active low-power wireless communication. Again, the term "test statistic" refers to a metric that describes one or more properties of a candidate frequency. Analysis units 44 may, for example, each implement analysis algorithms to determine a different one of the six test statistics described above. These test statistics are described below in more detail with respect to FIGS. 4A-4D.

Briefly, however, analysis units 44 may determine a height at the center of the energy concentration represented by the high-resolution PSD estimate. The height is measured as the difference between the maximum value of the PSD estimate and a reference floor value, which may also be referred to as a threshold in this disclosure. Analysis units 44 may also determine a width of the main lobe of the energy concentration, which may represent the bandwidth. The width is generally measured as the total number of frequency bins surrounding k satisfying $S[k]>S[k_c]/W$, where $W>1$ is a threshold parameter (for example, 6 dB). The number of frequency bins may be converted to hertz. In order to refine the width estimate, analysis units 44 may employ interpolation. Analysis units 44 may also determine the power of the main lobe of the energy concentration. The power is generally measured as the ration between the power of frequency bins surrounding k and the total power, which may be represented as $\Sigma_{k=k_c-V}^{k_c+V} S[k] / \Sigma_{k=K+1}^{K} S[k]$, where V is a parameter specifying the number of frequency bins that correspond to the main lobe. For example, V may be chosen as a number corresponding to 10 KHz.

Analysis units 44 output their various test statistics to decision unit 46, which represents a unit that determines, based on the test statistics, whether a corresponding candidate frequency for which the test statistics were calculates is currently in use by another wireless communication device. Decision unit 46 includes one or more thresholds 48 to which decision unit 46 compares the various test statistics.

Decision unit 46 may, for example, stored data defining one of thresholds 48 that corresponds to each test statistic derived by analysis units 44. Decision unit 46 may, alternatively, store one or more aggregate thresholds 48, where decision unit 46 may calculate aggregate test statistics using a weighted average or other linear or non-linear mathematical operation and then compare this aggregate test statistic to a corresponding one of the aggregate thresholds. In some instances, decision unit 46 compares the height determined by analysis units 44 above to a certain threshold as low-power wireless communication signals should have a height above approximately −114 dBm. Decision unit 46 may also compare the above determined width to a width threshold, as low-power wireless communication signals are modulated by voice or musing and thus are more dispersed in bandwidth. This width one of thresholds 48 may be determined through extensive simulation and lab testing. Decision unit 46 may also compare the power test statistic or metric to a power one of thresholds 48 for similar reasons to that described above with respect to the width one of thresholds 48.

In some instances, decision unit 46 may exploit known characteristics of TV signals or of wireless microphones to avoid false positives. That is, besides spurious emissions (e.g., manmade noise), there are some other narrowband signals that originate from co-channel NTSC (analog TV) audio carriers and intermodulation produced by adjacent channel NTSC video and audio carriers. Considering that the NTSC audio carrier is also analog FM, similar to most low-power wireless microphone communications, the algorithms for estimating the PSD fail to filter these signals, which may lead to false positives. Decision unit 46 may exploit known properties of TV signals or wireless microphones to identify the narrowband signals that may trigger false positives. Decision unit 46 may include a module or other unit that determines its geolocation and based on this geolocation, determine a list of known TV channels that are currently in use for this location. In this way, decision unit 46 may avoid these channels or frequencies by filtering any candidate frequencies in these known channels. To determine its goelocation, decision unit 46 may include or otherwise interface with a global positioning system (GPS) unit or module that provides information regarding the geolocation of decision unit 46.

For example, to identify narrowband signals that originate from co-channel NTSC audio carriers, sensing unit 20 should be located outside the protected contour of an NTSC station, but not too far away so that the NTSC audio carrier power is still above the −114 dBm sensing threshold. The NTSC audio carrier is usually located at 5.75 MHz above the lower edge of any given channel. To identify intermodulation produced by adjacent channel NTSC video and audio carriers, sensing unit 20 should operate in a channel whose lower or upper adjacent TV channel contains a reasonably strong NTSC signal, so that the intermodulated signal produced by the video and audio carriers is still above the −114 dBm sensing threshold. Due to the non-linearity of transmit or receive circuity, if two signals with frequencies $f_1$ and $f_2$ are intermodulated, two third-order intermodulated signals are produced at frequencies $2f_1-f_2$ and $2f_2-f_1$. From this relationship, decision unit 46 can calculate the following rules:

(a) If the NTSC signal is in the lower adjacent TV channel, then the intermodulated signal is located at 4.25 MHz above the lower edge of the currently sensed channel; and (b) IF the NTSC signal is in the upper adjacent TV channel, then the intermodulated signal is located at 2.75 MHz above the lower edge of the currently sensed channel.

Given the above, decision unit 46 may perform the following steps to leverage known properties of TV channels and carrier signals when selecting one of the candidate frequencies. First, decision unit 46 determines if there is any transmitting NTSC station on the currently sensed channel such that sensing unit 20 is located outside of its protected contour and receives its audio carrier at a power level beyond −114 dBm. If both of these are satisfied, decision unit 46 rejects the frequency at 5.75 MHz of the currently sensed channel. In this instance, the rejected frequency should also contain a small tolerance interval to handle local oscillator (LO) inaccuracy, where this tolerance interval could be set to, as one example, 10 KHz.

Decision unit 46 may next determine if there are any transmitting NTSC stations on the TV channel adjacent to the currently sensed channel in the portion of the frequency selection above the currently sensed channel such that sensing unit 20 receives its intermodulation of video and audio carriers at a power level beyond the −114 dBm. If this is detected, decision unit 46 may reject the frequency at 2.75 MHz of the currently sensed channel. Again, tolerance may be provided to account for LO inaccuracy.

Decision unit 46 may also determine if there is any transmitting NTSC station on the TV channel adjacent to the currently sensed channel in the portion of the frequency selection below the currently sensed channel such that sensing unit 20 receives its intermodulation of video and audio carriers at a power level beyond the −114 dBm. If this is detected, decision unit 46 may reject the frequency at 4.25 MHz of the currently sensed channel. Again, tolerance may be provided to account for LO inaccuracy.

Decision unit 46 may access a geolocation database or otherwise store data defining the goelocation database that indicates various properties of the NTSC stations. For example, the geolocation database may identify the transmit power of the NTSC station, the non-linearity characteristics of the NSTC transmit circuits and the propagation characteristics which usually exhibit random variation. Decision unit 46 may utilize these various properties of the NTSC stations to identify the false positives and proactively filter these candidate frequencies from selection.

In some instances, decision unit 46 may also rely on prior knowledge of low-power wireless communication frequencies. In this instance, decision unit 46 may access or otherwise maintain data that identifies all possible operational low-power wireless communication frequencies in any given market or location. Decision unit 46 may proactively filter those energy concentrations whose frequencies are not identified by the data from possible frequencies sensing unit 20 may use for wireless communications.

Based on this comparison of thresholds, known TV channel properties and prior knowledge of possible low-power wireless communication frequencies, decision unit 46 may determine whether a corresponding candidate frequency for which the test statistics were calculates is currently in use by another wireless communication device. Based on the determination by decision unit 46, sensing unit 20 configures various components included within sensing unit 20 but not shown for ease of illustration purposes to utilize this candidate frequency when wirelessly communicating with receivers, such as receivers 18.

Figure 3:
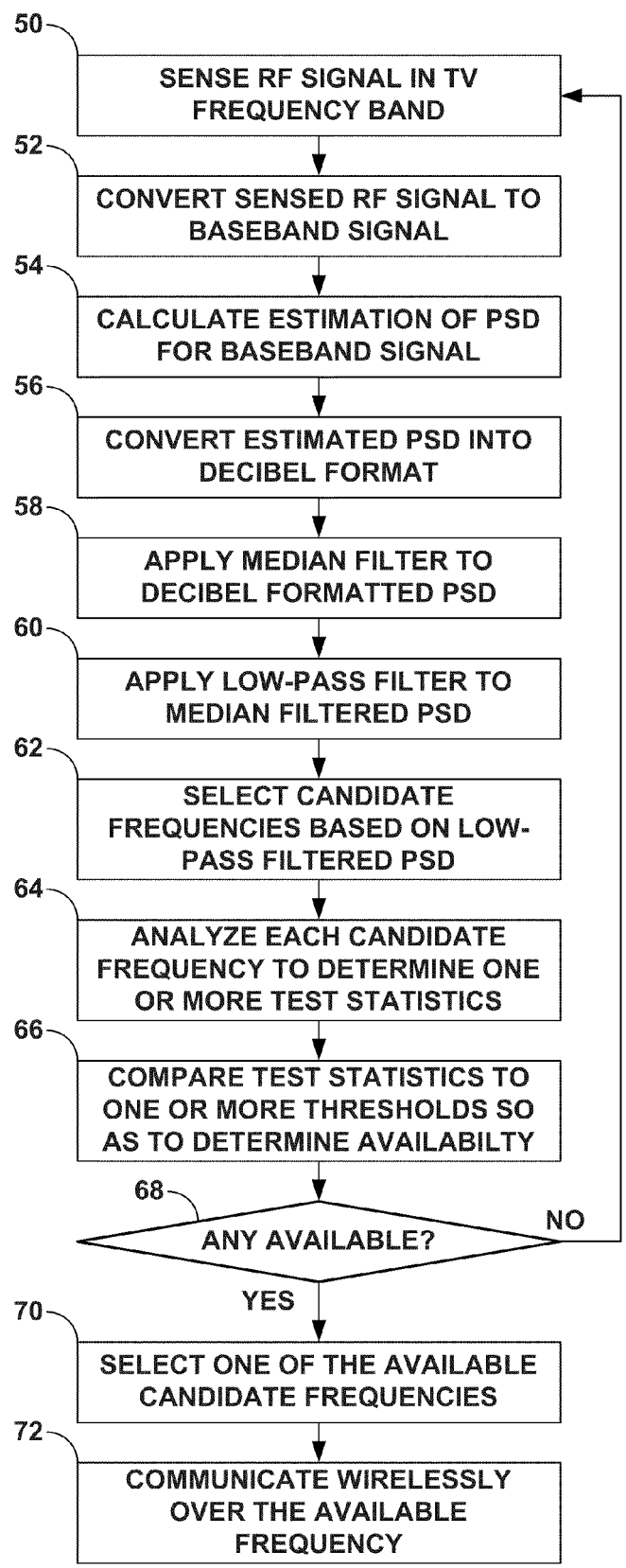
FIG. 3 is a flow chart illustrating example operation of a sensing unit in implementing various aspects of the techniques described in this disclosure.

FIG. 3 is a flow chart illustrating example operation of a sensing unit, such as sensing unit 20 as shown in the example of FIG. 2, in implementing various aspects of the techniques described in this disclosure. While described with respect to a particular unit, i.e., sensing unit 20, the techniques may be implemented by any device, unit or module capable of wireless communications in the television frequency bands. The techniques may, for example, be implemented in a combination of hardware and software, where hardware, such as processors, execute software instructions (usually in the form of a computer or software program) to implement the various aspects of the techniques described in this disclosure. The software instructions may be stored to a non-transitory computer-readable data storage medium. Example non-transitory computer-readable data storage mediums may include volatile memory, such as random access memory (RAM), dynamic RAM (DRAM) and other non-volatile memories, and/or non-volatile memories, such as static RAM (SRAM), Flash™ memory, read-only memory (ROM), electronic erasable ROM (EEROM), or any other type of non-volatile memory. Computer-readable data storage mediums may also include, as another example, storage devices such as compact disk ROMs (CD-ROMs), digital video disk ROMS (DVDs), hard drives, so-called "thumb drives," or any other type of storage device. In this sense, this computer-readable data storage medium may comprise the software instructions. Alternatively, the techniques of this disclosure may be implemented in hardware, which for example may include one or more digital signal processors (DSPs), general purpose microprocessors, application specific integrated circuits (ASICs), field programmable logic arrays (FPGAs), or other equivalent integrated or discrete logic circuitry.

As shown in the example of FIG. 3, RF sensing unit 30 of signal sensing unit 22 included within sensing unit 20 senses an RF signal in the television (TV) frequency band (50). In some instances, RF sensing unit 30 may sense the RF signal periodically, such as every 1 millisecond (ms) or second. In other instances, RF sensing unit 30 may sense the RF signal at random intervals or only prior to actively communicating wireless with a receiver, such as one of receivers 18 shown in the example of FIG. 1. In some instances, RF sensing unit 30 senses in response to some metric or other condition, e.g., after determining a certain amount of noise exists on a given channel. In yet other instances, one or more of the foregoing sensing algorithms may be employed together such that RF sensing unit 30 may effectively sense an RF signal to suit most any circumstance or requirement. RF-to-baseband converter 32 converts the sensed RF signal to a baseband signal in the manner described above (52). RF-to-baseband converter 32 outputs this baseband signal to PSD estimation unit 34 of frequency selection unit 24 included within sensing unit 20.

PSD estimation unit 34 calculates an estimate of a PSD for the baseband signal and outputs this PSD estimate to decibel conversion unit 36, which converts the estimate PSD into a decibel formal (54, 56). Median filter unit 38 applies a median filter to the decibel formatted estimate PSD to generate a median filtered estimate PSD as described above by way of example with respect to FIG. 2 (58). Low-pass filter unit 40 then applies a low-pass filter to the median filtered estimate PSD, outputting a low-pass filtered estimate PSD to candidate selection unit 42 (60). As described above, candidate selection unit 42 selects one or more candidate frequencies based on the low-pass filtered estimate PSD (62). Candidate selection unit 42 outputs these one or more candidate frequencies to one or more of analysis units 44, which analyze each candidate frequency to determine one or more test statistics, again as described above (64). Analysis units 44 output the respective test statistics to decision unit 46. Decision unit 46 processes the test statistics by comparing the test statistics to one or more of thresholds 48 so as to determine the availability of the candidate frequencies (66).

As noted above, based on the comparison, decision unit 46 determines the availability of each of the candidate frequencies (68). If none of the candidate frequencies are available ("NO" 68), decision unit 46 continues to sense RF signals and perform the before mentioned steps to assess certain other frequencies within the television frequency band (50-68). If one of the candidate frequencies is determined to be available ("YES" 68), decision unit 46 selects one of the available candidate frequencies (70). Decision unit 46 then programs sensing unit 20 to use this selected one of the candidate frequencies, whereupon sensing unit 20 communicates wirelessly over the selected one of the available candidate frequencies (72). The process or method illustrated in the example of FIG. 3 and described above may be implemented periodically or routinely, such as every one second, or in accordance with any other regulatory requirement for use of a given white space frequency, such as the above noted television frequencies.

Figure 4A:
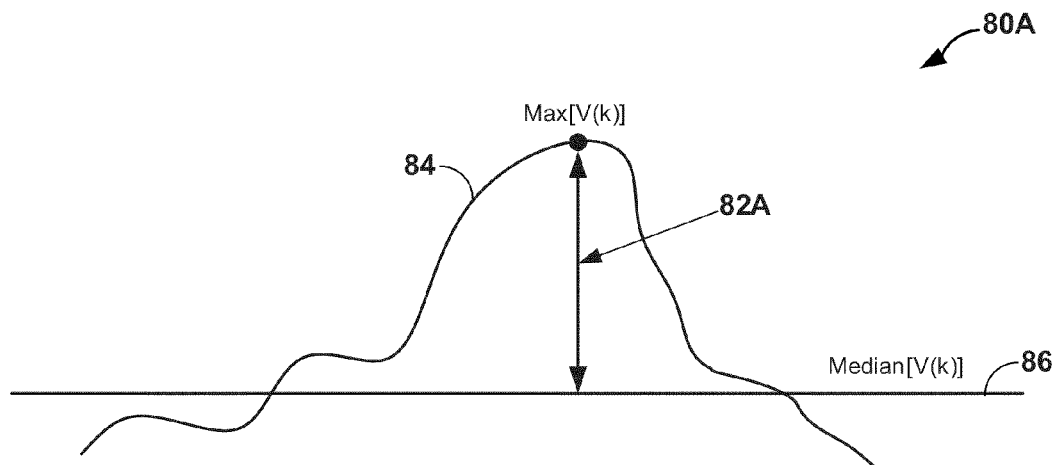
FIGS. 4A-4D each illustrates a graph describing a different test statistic computed in accordance with the techniques described in this disclosure.

FIGS. 4A-4D each illustrates a graph 80A-80D describing a different test statistic 82A-82D computed in accordance with the techniques described in this disclosure. FIG. 4A illustrates a graph 80A showing a first exemplary test statistic 82A. The solid line represents the above noted low-pass filtered PSD values referred to as V(k), where these values are denoted by the numeral 84. Test statistic 82A describes a max value of low-pass filtered PSD values 84, as measured from a reference value, which in this example is shown as a median of low-pass filtered PSD values 84.

In this sense, test statistic 82A represents the maximum value divided by a reference value (e.g., median[V(k)]) over the local segment of low-pass filtered PSD values 84 around any given candidate frequency. The reference value may comprise a mean or median of the segment around the candidate frequency. Test statistic 82A may be represented mathematically by the following equation (5):

$$T_1 = \max[V(k)] - \mathrm{median}[V(k)]. \qquad (5)$$

In equation (5), k varies over the segment of the filtered PSD centered around the candidate wireless frequency.

Figure 4B:
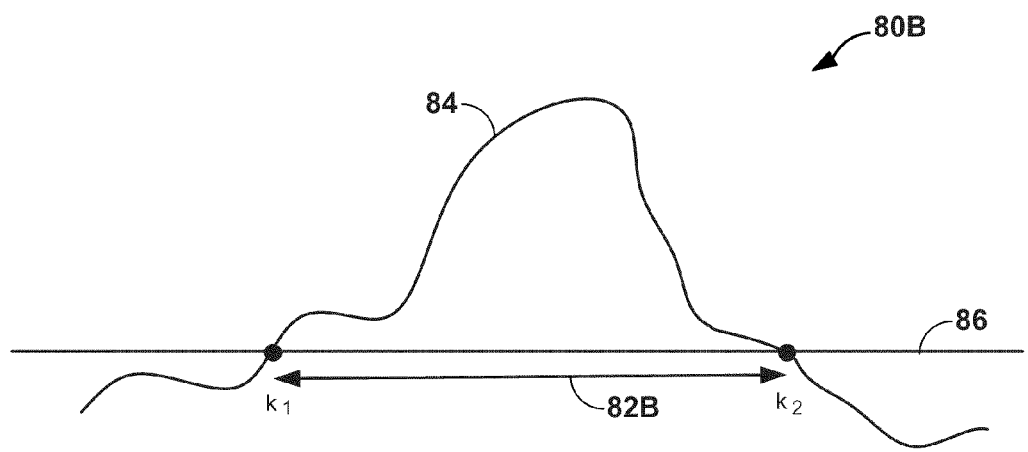

FIG. 4B illustrates a graph 80B showing a second exemplary test statistic 82B. As in FIG. 4A, the solid line represents the low-pass filtered estimate PSD values and for this reason, this line is also denoted as low-pass filtered estimate PSD values 84. Test statistic 82B describes the bandwidth around the candidate frequency, which may be mathematically described by the following equation (6):

$$T_2 = k_2 - k_1. \qquad (6)$$

As set forth in equation (6), the bandwidth around the candidate frequency can be calculated as the difference between two values of k at which the local signal intersects with a reference value 86, which again may be represented by a median of the low-pass filtered estimate PSD values.

Figure 4C:
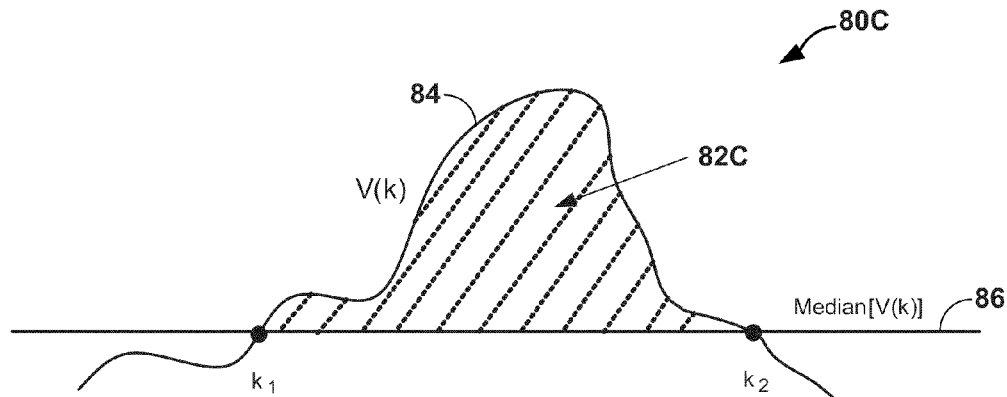

FIG. 4C illustrates a graph 90C showing another exemplary test statistic 82C. Test statistic 82C is a measurement of an area under the curve defined by low-pass filtered estimate PSD values 84 centered around the candidate frequency. Test statistic 82C is calculated with respect to a reference value 86, which may be substantially similar to reference values 86 shown in FIGS. 4A, 4B. Again, reference value 86 may either be represented as the median or the mean of the segment of values 84 around the candidate frequency. If $k_1$ and $k_2$ represent the indices of V(k) at which the filtered PSD values 84 crosses reference value 86, test statistic 82C may be defined mathematically according to the following equation (7):

$$T_3 = \sum_{k=k_1}^{k_2} V(k). \qquad (7)$$

Considering that V(k) is in decibels, this test statistic 80C is not the same as the power around the candidate frequency, but is equal to the sum of the values in decibels, which is generally equivalent to a product of the values in the linear domain and then converted to decibel. Test statistic 80C does not weight the large values as much as summing up the values in the linear domain.

Figure 4D:
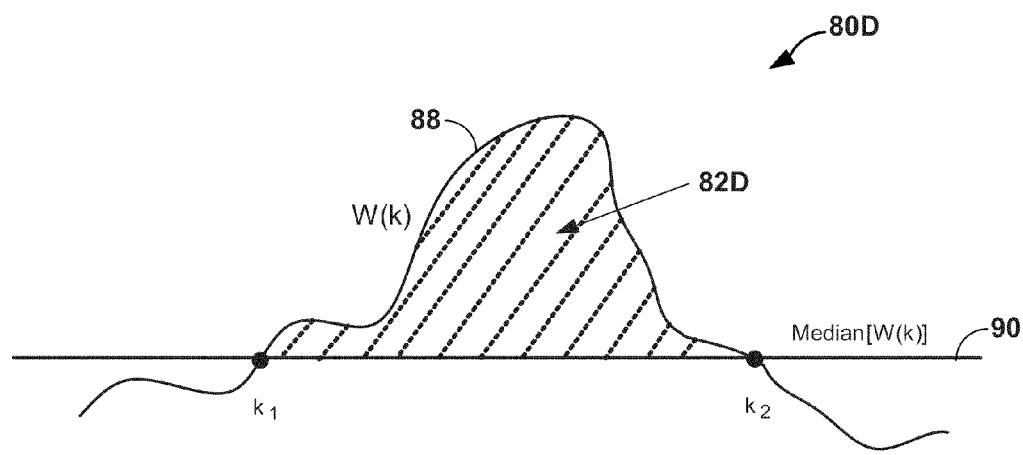

FIG. 4D illustrates a graph 90D showing a fourth exemplary test statistic 82D. Test statistic 82D is similar to test statistic 82C, except that test statistic 82D is computed in the linear domain rather than the decibel domain. In the example of FIG. 4D, graph 90D includes a set of values 88, which are denoted as W(k). W(k) values 88 represent V(k) converted from the decibel domain back into the linear domain. Values 88 may be calculated in accordance with the following equation (8):

$$W(k) = 10^{(F(k)/10)}. \qquad (8)$$

Given this conversion, test statistic 40D may be computed in accordance with the following equation (9):

$$T_4 = \sum_{k=k_1}^{k_2} W(k) \qquad (9)$$

In this way, test statistic 80D may be derived in a manner similar to that of test statistic 80C, where test statistic 80D represents the local power around the candidate wireless frequency.

As noted above, a number of different test statistics may be calculated or otherwise determined, including a fifth exemplary test statistic that provides a generalized mean for the PSD in the linear domain (W(k)). By varying a parameter p in the following equation (10), this implementation may provide either a standard mean or a geometric mean of the low-pass filtered estimated PSD. Equation (10) is as follows:

$$T_5 = \left( \frac{1}{k_2 - k_1 + 1} \sum_{k=k_1}^{k_2} W(k)^p \right)^{(1/p)}. \qquad (10)$$

By varying p, this test statistic can be adapted to a linear mean (p=1) and a geometric mean (p≈0). The parameter p may be set to any number in between these two values to further tailor the implementation to particular scenarios, circumstances or instances.

Another exemplary test statistic involves a sequence of PSDs and calculates properties or metrics from the sequence of PSDs in the frequencies centered around any given candidate frequency. Denoting the sequence of the i-th estimate PSD by $V_i(k)$ and the total number of sensing times by M, the sequence of PSDs may be denoted in accordance with the following equation (11):

$$V(k) = \{V_1(k), V_2(k), \ldots, V_M(k)\}, \qquad (11)$$

One or more of the five exemplary test statistics defined above may be calculated for this sequence, resulting in a sequence of test statistics that may be mathematically represented by equation (12):

$$T_i = \{T_i(1), T_i(2), \ldots, T_i(M)\} \qquad (12)$$

These sequence of test statistics could be compared to thresholds or other operations may be performed on these test statistic sequences in order to determine the availability of any given candidate frequency.

Using this sequence of test statistics, a number of other test statistics may be computed, including, for example, an average of the M test statistics, variance over the M test statistics, a peak-to-peak variation of the M test statistics, a generalized average of $T_1$ for different p exponent values and an autocorrelation function or correlation coefficient at different shifts to identify dependencies between the statistics, which for example may be used to check for Markovity properties that some speech signals exhibit. These and any other test statistic may be used when implementing the various aspects of the techniques described in this disclosure.

Figure 5:
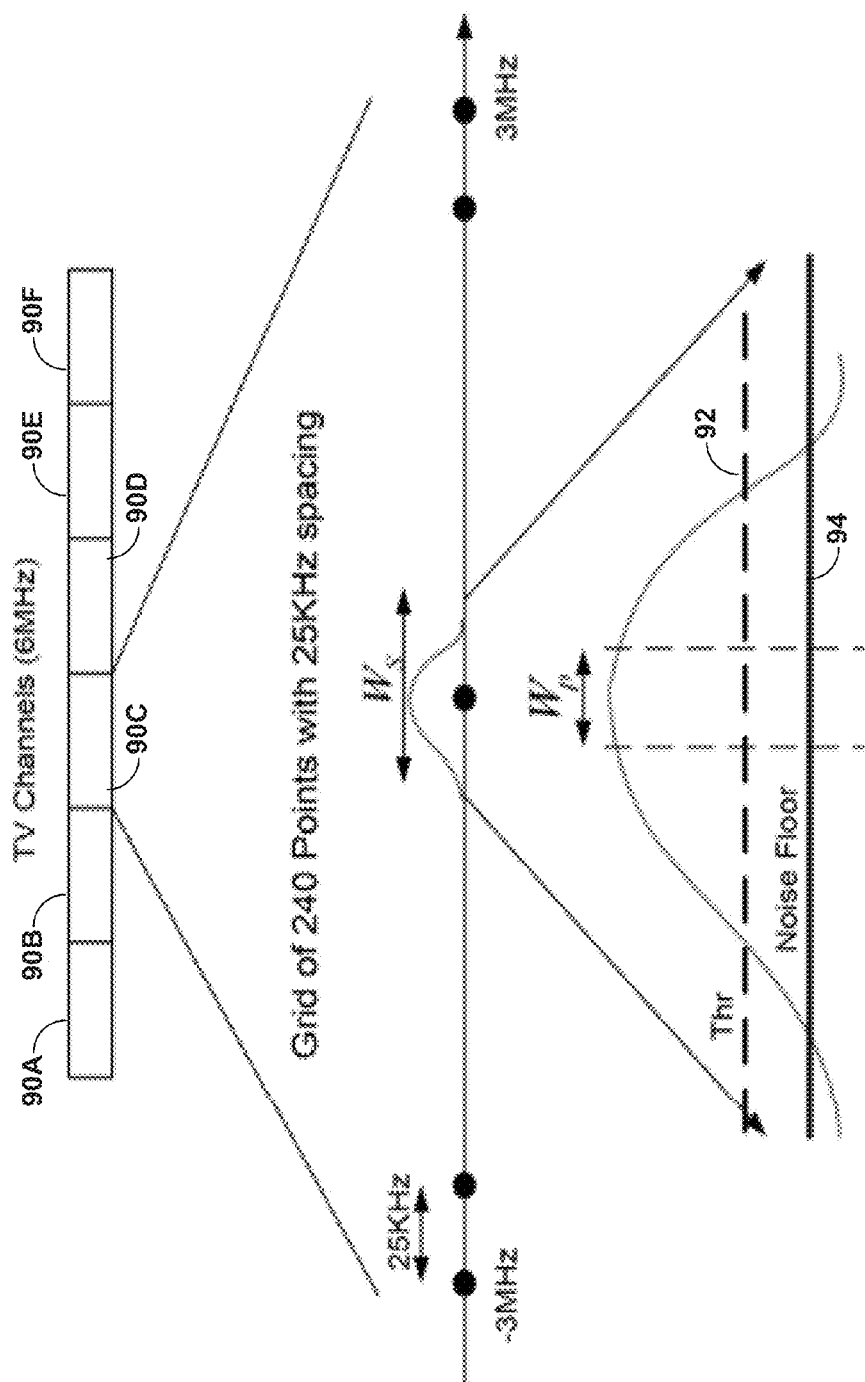
FIG. 5 is a diagram illustrating conceptual operation of a sensing unit in implementing various aspects of the techniques described in this disclosure.

FIG. 5 is a diagram illustrating conceptual operation of a sensing unit, such as sensing unit 20 shown in the example of FIG. 2, in implementing various aspects of the techniques described in this disclosure. In the conceptual diagram, a number of 6 MHz television (TV) channels are shown that are denoted as TV channels 90A-90F ("TV channels 90"). RF sensing unit 30 senses, in this example, TV channel 90C. Within TV channel 90C or any other one of TV channels 90, there exists 240 frequency points assuming 25 kilohertz (KHz) of spacing between two successive points. Candidate selection unit 42 selects one or more of these points as candidate frequencies using a test metric similar to the fifth exemplary test metric described above.

Generally, candidate selection unit 42 averages the PSD from the first M sensing times and identifies the peak of the PSD in a window of size $W_p$ around the frequency points, which may also be referred to as "grid points." This window may be chosen to allow for frequency offset due to local oscillator (LO) inaccuracy on both the transmitter and the receiver side. This window, for example, may be configured to 5 KHz. Also, Doppler effects are normally not accounted for given that it is assumed sensing unit 20 and one of receivers 18 are relatively stationary. This calculation may be represented by the following equation (12):

$$M_k = \max_{j:|f_j-f_k|<W_p/2} X_j, \qquad (12)$$

where $f_k$ is the frequency location of the k-th grid point and $f_j$ is the frequency location of the j-th bin in the PSD and $X_j$ is the value of the PSD in the j-th bin. The noise floor around the grid point may then be calculated by candidate selection unit 42 as the median of the PSD samples in a window of size $W_s$, where $W_s$ is 200 KHz in typical calculations. Candidate selection unit 42 uses the median operator as it is generally more robust to outliers in the spectrum. This noise floor around the k-th grid point may be denoted as $NF_k$ and is shown in the example of FIG. 5 as noise floor 94, which is represented mathematically by the following equation (13):

$$NF_k = \text{median}_{j:|f_j-f_k|<W_s/2} X_j. \qquad (13)$$

To calculate a so-called signal support set $\Omega$, which is used to compute the fifth test statistic for a test statistic set, candidate selection unit 42 may calculate a threshold 92 as a function of the peak and noise floor, meaning that the frequency bins around the peak that have PSD larger than threshold 92 constitute $\Omega$. First threshold 92, which is denoted by variable $\gamma_k$, is calculated in accordance with equation (14):

$$\gamma_k = NF_k*(M_k/NF_k)^\epsilon \qquad (14)$$

where $\epsilon$ is a design parameter and is typically set to 0.05. The signal support set $\Omega_k$ around the k-th grid point is then defined in accordance with the following equation (15):

$$\Omega_k = \{j:|f_j-f_k|<W_s/2 \text{ and } X_j>\gamma_k\}. \qquad (15)$$

The signal bandwidth (BW) may then be derived in accordance with the following equation (16):

$$BW_k = |\Omega_k| \qquad (16)$$

Candidate selection unit 42 may then calculate the LP norm in accordance with the following equation (17):

$$T_k = \left(\sum_{j\in\Omega} X_j^p\right)^{1/p}, \qquad (17)$$

where in this instance, p is a design parameter.

Candidate selection unit 42 then ranks the 240 possible peaks according to $T_k$, $1 \le k \le 240$. Those top ranked candidate frequencies are then passed from candidate selection unit 42 to analysis units 44, where analysis units 44 either perform the same analysis in parallel for each of the selected candidate frequencies or each perform a different analysis of the same one of the selected candidate frequencies. In any event, analysis units 44 compute the following three statistics for each of the selected candidate frequencies. First, analysis units 44 compute the LP norm of T. Second, analysis units 44 compute the average bandwidth or size of the support set. Third, analysis units 44 compute the dynamic range of the BW across quiet times $[\Delta(BW)]$.

As shown in FIG. 5, grid points are identified and a window $W_s$ is defined in which the above noted analysis is performed. A noise level 94 is computed by candidate selection unit 42 for use in selecting frequencies. A threshold 92 is defined from which to compute the above three test statistics. Based on these test statistics, an active wireless communication is detected when decision unit 46 applies the following equation (18) to the three computed test statistics:

$$WM\text{Detection}=1\{T \ge \beta_1 \cap BW \ge \beta_2 \cap \Delta(BW) \ge \beta_3\}, \qquad (18)$$

where $1\{\chi\}=1$ if $\chi$ is true. Otherwise, $1\{\chi\}=0$ if $\chi$ is false. $\beta_1$, $\beta_2$, and $\beta_3$ are thresholds that are normally set to 45 dB, 10 KHz and 8 KHz, respectively. The first one of candidate frequencies to satisfy this equation causes decision unit 46 to select that frequency. The above describes one implementation of the techniques described in this disclosure for purposes of illustration. The techniques may be implemented in this and any number of other ways and should not be limited to any of the examples set forth in this disclosure.

In one or more examples, the functions described may be implemented in hardware, software, firmware, or any combination thereof. If implemented in software, the functions may be stored on or transmitted over as one or more instructions or code on a computer-readable medium. Computer-readable mediums may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable data storage media may comprise random access memory (RAM), read-only memory (ROM), electrically erasable programmable ROM (EEPROM), compact disc-ROM (CD-ROM) or other optical disk storage, magnetic disk storage, or other magnetic storage devices, flash memory, or any other medium that can be used to carry or store desired program code in the form of instructions or data structures and that can be accessed by a computer. In this sense, the computer-readable storage medium may represent a non-transitory computer-readable storage medium.

Also, any connection is properly termed a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a communication medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. These disks and discs fall within the definition of a computer-readable medium. In this sense, the computer-readable medium represents a non-transitory computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
    sensing, with a sensing device, a signal in a range of frequencies reserved for use by television broadcast systems in broadcasting television content;
    calculating, with the sensing device, an estimate of a power spectral density (PSD) for the sensed signal;
    filtering, with the sensing device, the estimated PSD to remove noise and generate a filtered PSD for the sensed signal;
    analyzing, with the sensing device, the filtered PSD to identify one or more candidate frequencies within the range of frequencies, wherein the one or more candidate frequencies comprise frequencies potentially in use by one or more wireless communication devices;
    computing, with the sensing device, one or more test statistics for each of the one or more candidate frequencies, wherein each of the one or more test statistics define a property of the one or more candidate frequencies, and wherein the one or more test statistics include one or more of a height test statistic, a width test statistic, an area test statistic, and a mean test statistic; and
    comparing, with the sensing device, the one or more test statistics to one or more thresholds to identify those of the candidate frequencies that are actively in use by the one or more wireless communication devices, wherein a particular threshold value of the one or more thresholds identifies a median or a mean of all values of the filtered PSD within a window of the filtered PSD.

2. The method of claim 1, further comprising converting the estimated PSD from a linear domain to a logarithmic domain, wherein the logarithmic estimated PSD is expressed in a decibel format,
    wherein filtering the estimated PSD comprises filtering the logarithmic estimated PSD to remove noise and generate the filtered PSD for the sensed signal.

3. The method of claim 1, wherein computing one or more test statistics comprises computing a height test statistic for at least one of the one or more candidate frequencies that defines a height property of the filtered PSD, wherein the height property is defined as a maximum value of the filtered PSD within the window of the filtered PSD minus the particular threshold value.

4. The method of claim 1, wherein computing one or more test statistics comprises computing a width test statistic for at least one of the one or more candidate frequencies that defines a width property of the filtered PSD, wherein the width property is defined as a difference between two values of the filtered PSD within the window of the filtered PSD where the filtered PSD intersects the particular threshold value.

5. The method of claim 1, further comprising converting the estimated PSD from a linear domain to a logarithmic domain, wherein the logarithmic estimated PSD is expressed in a decibel format,
    wherein filtering the estimated PSD comprises filtering the logarithmic estimated PSD to remove noise and generate the filtered PSD for the sensed signal,
    wherein computing one or more test statistics comprises computing an area test statistic for at least one of the one or more candidate frequencies that defines an area property of the filtered PSD, wherein the area property is defined as an area of the filtered PSD within the window of the filtered PSD as measured with respect to the particular threshold value.

6. The method of claim 1, wherein computing one or more test statistics comprises computing an area test statistic for at least one of the one or more candidate frequencies that defines an area property of the filtered PSD, wherein the area property is defined as an area of the filtered PSD within the window of the filtered PSD as measured with respect to the particular threshold value.

7. The method of claim 1, wherein computing one or more test statistics comprises computing a configurable test statistic in accordance with the following equation:

$$T_5 = \left( \frac{1}{k_2 - k_1 + 1} \sum_{k=k_1}^{k_2} W(k)^p \right)^{(1/p)},$$

where $T_5$ represents the configurable test statistic, $k_1$ and $k_2$ represent two values of the filtered PSD that intersect the particular threshold value, $W(k)$ represents the filtered PSD in a linear domain, and p represents a configurable parameter,
    wherein $T_5$ computes a generalized mean of the filtered PSD in the linear domain, and
    wherein the configurable parameter p allows the equation to compute a linear mean when p is set to approximately one and a geometric mean when p is set to a number near zero.

8. The method of claim 1, further comprising:
    sensing, with the sensing device, multiple signals over time in a range of frequencies reserved for use by television broadcast systems in broadcasting television content;
    calculating, with the sensing device, an estimate of a power spectral density (PSD) for each of the sensed signals;
    filtering, with the sensing device, each of the estimated PSDs to remove noise and generate respective filtered PSDs for each of the sensed signals,
    wherein computing one or more test statistics comprises:
    forming a sequence of PSDs from the respective filtered PSDs;
    computing a sequence of test statistics for the sequence of PSDs; and calculating additional test statistics from the sequence of test statistics, wherein the additional test statistics include one or more of an average of the sequence of test statistics, a variance of the sequence of test statistics, a peak-to-peak variation of the sequence of test statistics, a generalized average of the sequence for test statistics and a correlation coefficient.

9. The method of claim 1, wherein analyzing the filtered PSD to identifying one or more candidate frequencies includes:
   analyzing the filtered PSD to select a portion of the filtered PSD having a maximum value; and
   identifying the center of the selected portion as a candidate frequency.

10. The method of claim 1, wherein analyzing the filtered PSD to identifying one or more candidate frequencies includes:
    analyzing the filtered PSD to select a portion of the filtered PSD having a local maximum value; and
    identifying the center of the selected portion as a candidate frequency.

11. The method of claim 1,
    wherein the sensing device comprises a white space device, and
    wherein the one or more wireless communication devices comprises at least one low-power wireless microphone, and
    the method further comprising:
    selecting, with the white space device, one or more of the candidate frequencies over which to communicate wirelessly based on the comparison.

12. A sensing device for sensing wireless communications comprising:
    a sensing unit that senses a signal in a range of frequencies reserved for use by television broadcast systems in broadcasting television content;
    a power spectral density (PSD) estimation unit that calculates an estimate of a power spectral density (PSD) for the sensed signal;
    at least one filter unit that filters the estimated PSD to remove noise and generate a filtered PSD for the sensed signal;
    a candidate selection unit that analyzes the filtered PSD to identify one or more candidate frequencies within the range of frequencies, wherein the one or more candidate frequencies comprise frequencies potentially in use by one or more wireless communication devices;
    one or more analysis units to compute one or more test statistics for each of the one or more candidate frequencies, wherein each of the one or more test statistics define a property of the one or more candidate frequencies, and wherein the one or more test statistics include one or more of a height test statistic, a width test statistic, an area test statistic, and a mean test statistic; and
    a decision unit that compares the one or more test statistics to one or more thresholds to identify those of the candidate frequencies that are actively in use by the one or more wireless communication devices, wherein a particular threshold value of the one or more thresholds identifies a median or a mean of all values of the filtered PSD within a window of the filtered PSD.

13. The sensing device of claim 12, further comprising a decibel conversion unit that converts the estimated PSD from a linear domain to a logarithmic domain, wherein the logarithmic estimated PSD is expressed in a decibel format, wherein the at least one filter unit filters the logarithmic estimated PSD to remove noise and generate the filtered PSD for the sensed signal.

14. The sensing device of claim 12, wherein the one or more analysis units compute a height test statistic for at least one of the one or more candidate frequencies that defines a height property of the filtered PSD, and wherein the height property is defined as a maximum value of the filtered PSD within the window of the filtered PSD minus the particular threshold value.

15. The sensing device of claim 12, wherein the one or more analysis units compute a width test statistic for at least one of the one or more candidate frequencies that defines a width property of the filtered PSD, and wherein the width property is defined as a difference between two values of the filtered PSD within the window of the filtered PSD where the filtered PSD intersects the particular threshold value.

16. The sensing device of claim 12, further comprising a decibel conversion unit that converts the estimated PSD from a linear domain to a logarithmic domain, wherein the logarithmic estimated PSD is expressed in a decibel format,
    wherein the at least one filter unit filters the logarithmic estimated PSD to remove noise and generate the filtered PSD for the sensed signal,
    wherein the one or more analysis units compute an area test statistic for at least one of the one or more candidate frequencies that defines an area property of the filtered PSD, and wherein the area property is defined as an area of the filtered PSD within the window of the filtered PSD as measured with respect to the particular threshold value.

17. The sensing device of claim 12, wherein the one or more analysis units compute an area test statistic for at least one of the one or more candidate frequencies that defines an area property of the filtered PSD, and wherein the area property is defined as an area of the filtered PSD within the window of the filtered PSD as measured with respect to the particular threshold value.

18. The sensing device of claim 12, wherein the one or more analysis units compute a configurable test statistic in accordance with the following equation:

$$T_5 = \left( \frac{1}{k_2 - k_1 + 1} \sum_{k=k_1}^{k_2} W(k)^p \right)^{(1/p)},$$

where $T_5$ represents the configurable test statistic, $k_1$ and $k_2$ represent two values of the filtered PSD that intersect the particular threshold value, $W(k)$ represents the filtered PSD in a linear domain, and p represents a configurable parameter,
    wherein $T_5$ computes a generalized mean of the filtered PSD in the linear domain, and
    wherein the configurable parameter p allows the equation to compute a linear mean when p is set to approximately one and a geometric mean when p is set to a number near zero.

19. The sensing device of claim 12,
    wherein the sensing unit senses multiple signals over time in a range of frequencies reserved for use by television broadcast systems in broadcasting television content;
    wherein the PSD estimation unit calculates an estimate of a power spectral density (PSD) for each of the sensed signals;

wherein the at least one filter unit filters each of the estimated PSDs to remove noise and generate respective filtered PSDs for each of the sensed signals, wherein the one or more analysis units form a sequence of PSDs from the respective filtered PSDs, compute a sequence of test statistics for the sequence of PSDs, and calculate additional test statistics from the sequence of test statistics, wherein the additional test statistics include one or more of an average of the sequence of test statistics, a variance of the sequence of test statistics, a peak-to-peak variation of the sequence of test statistics, a generalized average of the sequence for test statistics and a correlation coefficient.

20. The sensing device of claim 12, wherein the candidate selection unit analyzes the filtered PSD to select a portion of the filtered PSD having a maximum value, and identifies the center of the selected portion as a candidate frequency.

21. The sensing device of claim 12, wherein the candidate selection unit further analyzes the filtered PSD to select a portion of the filtered PSD having a local maximum value and identifies the center of the selected portion as a candidate frequency.

22. The sensing device of claim 12,
wherein the sensing device comprises a white space device,
wherein the one or more wireless communication devices comprises at least one a low-power wireless microphone, and
wherein the decision unit further selects one or more of the candidate frequencies over which to communicate wirelessly based on the comparison.

23. An apparatus comprising:
means for sensing a signal in a range of frequencies reserved for use by television broadcast systems in broadcasting television content;
means for calculating an estimate of a power spectral density (PSD) for the sensed signal;
means for filtering the estimated PSD to remove noise and generate a filtered PSD for the sensed signal;
means for analyzing the filtered PSD to identify one or more candidate frequencies within the range of frequencies, wherein the one or more candidate frequencies comprise frequencies potentially in use by one or more wireless communication devices;
means for computing one or more test statistics for each of the one or more candidate frequencies, wherein each of the one or more test statistics define a property of the one or more candidate frequencies, and wherein the one or more test statistics include one or more of a height test statistic, a width test statistic, an area test statistic, and a mean test statistic;
means for comparing the one or more test statistics to one or more thresholds to identify those of the candidate frequencies that are actively in use by the one or more wireless communication devices, wherein a particular threshold value of the one or more thresholds identifies a median or a mean of all values of the filtered PSD within a window of the filtered PSD.

24. The apparatus of claim 23, further comprising means for converting the estimated PSD from a linear domain to a logarithmic domain, wherein the logarithmic estimated PSD is expressed in a decibel format,
wherein the means for filtering the estimated PSD comprises means for filtering the logarithmic estimated PSD to remove noise and generate the filtered PSD for the sensed signal.

25. The apparatus of claim 23, wherein the means for computing one or more test statistics comprises means for computing a height test statistic for at least one of the one or more candidate frequencies that defines a height property of the filtered PSD, and wherein the height property is defined as a maximum value of the filtered PSD within the window of the filtered PSD minus a threshold value.

26. The apparatus of claim 23, wherein the means for computing one or more test statistics comprises means for computing a width test statistic for at least one of the one or more candidate frequencies that defines a width property of the filtered PSD, and wherein the width property is defined as a difference between two values of the filtered PSD within the window of the filtered PSD where the filtered PSD intersects the particular threshold value.

27. The apparatus of claim 23, further comprising means for converting the estimated PSD from a linear domain to a logarithmic domain, wherein the logarithmic estimated PSD is expressed in a decibel format,
wherein the means for filtering the estimated PSD comprises means for filtering the logarithmic estimated PSD to remove noise and generate the filtered PSD for the sensed signal,
wherein the means for computing one or more test statistics comprises means for computing an area test statistic for at least one of the one or more candidate frequencies that defines an area property of the filtered PSD, and wherein the area property is defined as an area of the filtered PSD within the window of the filtered PSD as measured with respect to the particular threshold value.

28. The apparatus of claim 23, wherein the means for computing one or more test statistics comprises means for computing an area test statistic for at least one of the one or more candidate frequencies that defines an area property of the filtered PSD, and wherein the area property is defined as an area of the filtered PSD within the window of the filtered PSD as measured with respect to the particular threshold value.

29. The apparatus of claim 23, wherein the means for computing one or more test statistics comprises means for computing a configurable test statistic in accordance with the following equation:

$$T_5 = \left( \frac{1}{k_2 - k_1 + 1} \sum_{k=k_1}^{k_2} W(k)^p \right)^{(1/p)},$$

where $T_5$ represents the configurable test statistic, $k_1$ and $k_2$ represent two values of the filtered PSD that intersect the particular threshold value, $W(k)$ represents the filtered PSD in a linear domain, and p represents a configurable parameter,
wherein $T_5$ computes a generalized mean of the filtered PSD in the linear domain, and
wherein the configurable parameter p allows the equation to compute a linear mean when p is set to approximately one and a geometric mean when p is set to a number near zero.

30. The apparatus of claim 23,
wherein the means for sensing comprise means for sensing multiple signals over time in a range of frequencies reserved for use by television broadcast systems in broadcasting television content;
wherein the means for calculating comprises means for calculating an estimate of a power spectral density (PSD) for each of the sensed signals;

wherein the means for filtering comprises means for filtering each of the estimated PSDs to remove noise and generate respective filtered PSDs for each of the sensed signals,
wherein the means for computing one or more test statistics comprises:
means for forming a sequence of PSDs from the respective filtered PSDs;
means for computing a sequence of test statistics for the sequence of PSDs; and
means for calculating additional test statistics from the sequence of test statistics, wherein the additional test statistics include one or more of an average of the sequence of test statistics, a variance of the sequence of test statistics, a peak-to-peak variation of the sequence of test statistics, a generalized average of the sequence for test statistics and a correlation coefficient.

31. The apparatus of claim 23, wherein the means for analyzing the filtered PSD to identifying one or more candidate frequencies includes:
means for analyzing the filtered PSD to select a portion of the filtered PSD having a maximum value; and
means for identifying the center of the selected portion as a candidate frequency.

32. The apparatus of claim 23, wherein the means for analyzing the filtered PSD to identifying one or more candidate frequencies includes:
means for analyzing the filtered PSD to select a portion of the filtered PSD having a local maximum value; and
means for identifying the center of the selected portion as a candidate frequency.

33. The apparatus of claim 23,
wherein the apparatus comprises a white space device,
wherein the one or more wireless communication device comprise at least one low-power wireless microphone, and
wherein the apparatus comprises means for selecting one or more of the candidate frequencies over which to communicate wirelessly based on the comparison.

34. A non-transitory computer-readable storage medium comprising instructions that cause a processor to:
sense a signal in a range of frequencies reserved for use by television broadcast systems in broadcasting television content;
calculate an estimate of a power spectral density (PSD) for the sensed signal;
filter the estimated PSD to remove noise and generate a filtered PSD for the sensed signal;
analyze the filtered PSD to identify one or more candidate frequencies within the range of frequencies, wherein the one or more candidate frequencies comprise frequencies potentially in use by one or more wireless communication devices;
compute one or more test statistics for each of the one or more candidate frequencies, wherein each of the one or more test statistics define a property of the one or more candidate frequencies, and wherein the one or more test statistics include one or more of a height test statistic, a width test statistic, an area test statistic, and a mean test statistic; and
compare the one or more test statistics to one or more thresholds to identify those of the candidate frequencies that are actively in use by the one or more wireless communication devices, wherein a particular threshold value of the one or more thresholds identifies a median or a mean of all values of the filtered PSD within a window of the filtered PSD.

35. The non-transitory computer-readable storage medium of claim 34, further comprising instructions that cause the processor to:
convert the estimated PSD from a linear domain to a logarithmic domain, wherein the logarithmic estimated PSD is expressed in a decibel format; and
filter the logarithmic estimated PSD to remove noise and generate the filtered PSD for the sensed signal.

36. The non-transitory computer-readable storage medium of claim 34, further comprising instructions that cause the processor to compute a height test statistic for at least one of the one or more candidate frequencies that defines a height property of the filtered PSD, and wherein the height property is defined as a maximum value of the filtered PSD within the window of the filtered PSD minus the particular threshold value.

37. The non-transitory computer-readable storage medium of claim 34, further comprising instructions that cause the processor to compute a width test statistic for at least one of the one or more candidate frequencies that defines a width property of the filtered PSD, and wherein the width property is defined as a difference between two values of the filtered PSD within the window of the filtered PSD where the filtered PSD intersects the particular threshold value.

38. The non-transitory computer-readable storage medium of claim 34, further comprising instructions that cause the processor to:
convert the estimated PSD from a linear domain to a logarithmic domain, wherein the logarithmic estimated PSD is expressed in a decibel format;
filter the logarithmic estimated PSD to remove noise and generate the filtered PSD for the sensed signal; and
compute an area test statistic for at least one of the one or more candidate frequencies that defines an area property of the filtered PSD, and wherein the area property is defined as an area of the filtered PSD within the window of the filtered PSD as measured with respect to the particular threshold value.

39. The non-transitory computer-readable storage medium of claim 34, further comprising instructions that cause the processor to compute an area test statistic for at least one of the one or more candidate frequencies that defines an area property of the filtered PSD, and wherein the area property is defined as an area of the filtered PSD within the window of the filtered PSD as measured with respect to the particular threshold value.

40. The non-transitory computer readable storage of claim 34, further comprising instructions that cause the processor to compute a configurable test statistic in accordance with the following equation:

$$T_5 = \left(\frac{1}{k_2 - k_1 + 1} \sum_{k=k_1}^{k_2} W(k)^p\right)^{(1/p)},$$

where $T_5$ represents the configurable test statistic, $k_1$ and $k_2$ represent two values of the filtered PSD that intersect the particular threshold value, $W(k)$ represents the filtered PSD in a linear domain, and p represents a configurable parameter,
wherein $T_5$ computes a generalized mean of the filtered PSD in the linear domain, and
wherein the configurable parameter p allows the equation to compute a linear mean when p is set to approximately one and a geometric mean when p is set to a number near zero.

41. The non-transitory computer-readable storage medium of claim 34, further comprising instructions that cause the processor to:
- sense multiple signals over time in a range of frequencies reserved for use by television broadcast systems in broadcasting television content;
- calculate an estimate of a power spectral density (PSD) for each of the sensed signals;
- filter each of the estimated PSDs to remove noise and generate respective filtered PSDs for each of the sensed signals;
- form a sequence of PSDs from the respective filtered PSDs;
- compute a sequence of test statistics for the sequence of PSDs; and
- calculate additional test statistics from the sequence of test statistics, wherein the additional test statistics include one or more of an average of the sequence of test statistics, a variance of the sequence of test statistics, a peak-to-peak variation of the sequence of test statistics, a generalized average of the sequence for test statistics and a correlation coefficient.

42. The non-transitory computer-readable storage medium of claim 34, further comprising instructions that cause the processor to:
- analyze the filtered PSD to select a portion of the filtered PSD having a maximum value; and
- identify the center of the selected portion as a candidate frequency.

43. The non-transitory computer-readable storage medium of claim 34, further comprising instructions that cause the processor to:
- analyze the filtered PSD to select a portion of the filtered PSD having a local maximum value; and
- identify the center of the selected portion as a candidate frequency.

44. The non-transitory computer-readable storage medium of claim 34,
- wherein the non-transitory computer-readable storage medium is included within a white space device,
- wherein the one or more wireless communication device comprise at least one low-power wireless microphone, and
- wherein the instructions further cause the processor to select one or more of the candidate frequencies over which to communicate wirelessly based on the comparison.

* * * * *